Feb. 26, 1952    C. E. ADAMS ET AL    2,587,425
REFORMING NAPHTHA WITH ACTIVATED CARBON CATALYST
Filed April 30, 1949
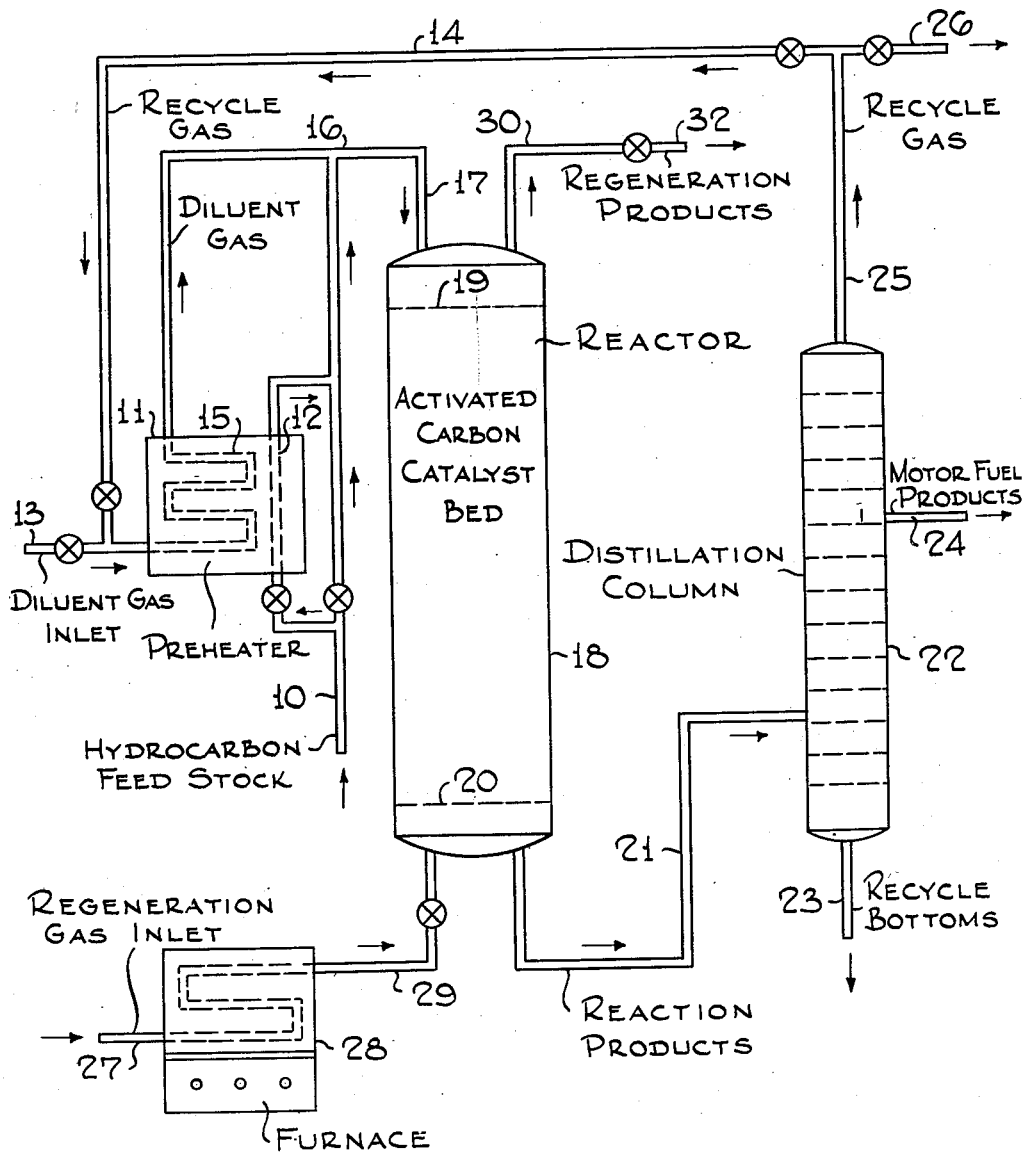
Clark E. Adams
Charles N. Kimberlin, Jr. Inventors
By Serge J. Hilbery Attorney Patented Feb. 26, 1952

2,587,425

UNITED STATES PATENT OFFICE 2,587,425

REFORMING NAPHTHA WITH ACTIVATED CARBON CATALYST

Clark E. Adams and Charles N. Kimberlin, Jr., Baton Rouge, La., assignors to Standard Oil Development Company, a corporation of Delaware Application April 30, 1949, Serial No. 90,574

2 Claims. (Cl. 196—50)

The present invention pertains to an improved method for the conversion of hydrocarbons of low anti-knock characteristics into hydrocarbons having high anti-knock properties and particularly to a method for reforming of naphthas in the presence of activated carbon catalysts to form high anti-knock motor fuel.

It has previously been proposed to subject naphthas to elevated temperatures and pressures, preferably in the presence of hydrogen or recycle gas rich in hydrogen and in the presence of catalytic materials in order to reform the naphtha and improve its knock rating. It has been found that activated carbon is a very effective catalyst for such treatments. However, a real problem is presented in regenerating activated carbon catalysts after they have become spent by the deposition thereon of inactivating carbonaceous deposits.

It is the primary object of this invention to provide the art with an improved method of catalytically converting hydrocarbons into motor fuels of high anti-knock properties.

It is also the object of this invention to provide an improved method of regenerating activated carbon catalysts that have become spent or deactivated during the catalytic reforming of hydrocarbons.

These and other objects will appear more clearly from the detailed specification and claims which follow.

It has now been found that activated carbon catalysts that have been used in fixed bed naphtha reforming can be advantageously regenerated by passing the stream of regeneration gas through the bed of catalyst in a direction opposite to that in which the hydrocarbon material is passed through the bed during the reforming operation. It has been found that whereas the average surface area of a spent activated carbon bed is not appreciably increased when the regeneration gas is passed through the bed in the same direction as the hydrocarbon feed, the surface area of the activated carbon is substantially restored to the initial value when the regeneration gas is passed through the catalyst bed in a direction opposite to that in which the hydrocarbons undergoing reaction are passed through the bed. Since surface area is a measure of the catalytic activity of activated carbon, it is obvious that substantial advantages as to yield and catalyst life can be obtained with the process in accordance with the present invention.

Activated carbons useful as catalysts for reforming of naphthas may be derived from either petroleum, coal, animal or vegetable sources in known manner. For example, raw cellulosic materials such as sawdust, peat, brown coal and the like are treated with or without preliminary carbonization with zinc chloride or other activating agent after which the material is calcined in an enclosed chamber at a moderate temperature and the residual material is washed to eliminate the salts. Alternatively a carbonaceous material, either raw or after preliminary carbonization, is brought to red heat and submitted to the semi-oxidizing action of activating gases such as steam or carbon dioxide. The catalyst, which may be in the form of particles or granules of about 1 to 10 mm. diameter is arranged as a fixed bed in a suitable reactor. The reactor may be of any desired design so long as it is provided with an inlet for feed stock and an outlet for regeneration gases at one end and an outlet for reaction products and an inlet for regeneration gas at the opposite end of the reactor. Suitable distributor means may be arranged at each end of the reactor to insure uniform distribution of the feed stocks and regeneration gas over the entire cross-section of the reactor.

The hydrocarbon materials which may be advantageously treated in accordance with the present invention are virgin naphthas boiling from about 100° F. to about 450° F. or narrower boiling fractions within this range. A very desirable feed is a light virgin naphtha boiling in the range of 145° F. to 215° F. although lighter as well as heavier virgin naphthas respond well to reforming in the presence of activated carbon catalysts.

The reforming operation is conducted at temperatures of about 900° F. to about 1100° F., preferably at a temperature of about 1000 to 1060° F. and at atmospheric or superatmospheric pressures of up to about 250 lbs. per sq. in., preferably at 50 to 100 lbs. per sq. in. It is desirable to provide hydrogen in the reaction zone either by the direct supply of hydrogen thereto or preferably by recycling process gases to the reaction zone. Under the reaction conditions indicated there is no net consumption of hydrogen in the reaction and accordingly recycle of the process gases should provide a sufficient hydrogen partial pressure in the reaction zone. Steam may be used to replace a part or all of the hydrogen used in the reaction zone.

Regeneration of the spent, activated carbon may be effected by passing regeneration gases such as steam or carbon dioxide, with or without the admixture of air through the catalyst bed. As indicated above, the regeneration gases should be passed through the catalyst bed in a direction opposite to that in which the hydrocarbon feed stock is passed through the catalyst bed.

A certain amount of heat should be supplied to the catalyst bed by the regeneration gases as by passing them through a preheater. It is preferable to effect regeneration at substantially atmospheric pressure rather than superatmospheric pressures. The temperature of regeneration may vary from about 1000° F. to 2000° F. depending upon the type of catalyst used, the presence of certain promoters and the length of time required for regeneration.

The accompanying drawing illustrates diagrammatically a flow plan of the process in accordance with the present invention.

In the drawing, 10 is a feed stock inlet line, 11 is a preheater or furnace for preheating the feed stock and the diluent gas. In order to minimize thermal degradation of the feed stock, only a portion of the feed stock is passed through line 12 arranged in the preheater or the feed stock is preheated to a temperature such as about 600–800° F. well below the temperature at which thermal effects become appreciable.

Diluent gas may be supplied to the system through inlet line 13 or dilution may be effected with recycle or process gas supplied through line 14. The diluent gas is passed through coil 15 in the preheater or furnace 11 and is heated to a temperature of about 1000 to 1600° F. which is sufficiently high to vaporize the feed stock and supply the endothermic heat of reaction when combined in sufficient amount with the cool or partially heated feed stock at mixing point 16. The line 17 between the mixing point and the reactor is kept as short as possible in order to minimize thermal effects as much as possible.

The reactor 18 may be of any desired size or shape so long as it provides for sufficient time of contact of vaporous reactant and catalyst. The reactor may be arranged vertically as shown or it may be arranged horizontally. Furthermore, the inlet line 17 for reactants and diluents may also be connected to the bottom rather than the top of the reactor 18 as shown. The reactor is charged with activated carbon particles which may be held substantially in place by screens or distribution grids 19 and 20.

Reaction products are discharged from the reactor 18 through line 21 and passed to suitable recovery equipment such as distillation column 22 from which a high boiling or bottom fraction can be removed through line 23 and recycled to the reforming reactor along with fresh feed or passed to other suitable processing equipment. A motor fuel product of high anti-knock value is removed from the distillation column through line 24 while the process gases are taken overhead through line 25. The process gases may be recycled through lines 25 and 14 and serve as the diluent gas in the reforming operation. Alternatively all or part of the process gas may be removed from the system through vent line 26 or passed to a suitable accumulator for use as desired.

Regeneration gas such as steam, carbon dioxide with or without air is supplied to the system through inlet line 27 and is passed through furnace 28 wherein it is heated to a temperature of about 1000 to 2000° F. The preheated regeneration gas is conducted to the reactor 18 through line 29. In accordance with this invention, the inlet line 29 for the supply of regeneration gas is connected to the end of the reactor opposite to that at which the reactants are supplied. An outlet line 30 for the withdrawal of regeneration products is arranged at the end of the reactor opposite that in which the inlet for regeneration gases is arranged. The regeneration products withdrawn from the system through outlet line 32 and part or all of it may be used as diluent gas in the reforming operation.

The process in accordance with the invention is as follows. A hydrocarbon feed stock such as a light virgin naphtha is preheated to a temperature of at most about 800° F. and combined at 16 with diluent gas that has been heated to about 1400° F. The temperature of the diluent gas and the relative proportions of diluent gas and naphtha feed are so correlated as to vaporize the feed stock and supply the endothermic heat of reaction. The mixture of hydrocarbon feed stock and diluent is introduced as rapidly as possible into the reactor where it contacts activated carbon particles. The temperature in the reactor varies between about 950° F. and about 1100° F. at the inlet end and between about 900 and about 1050° F. at the outlet end. The reaction products are withdrawn from the end of the reactor opposite to that at which the reactant and diluent is introduced. The reaction products are then taken to suitable recovery equipment such as a distillation column or tower wherein one or more liquid fractions are separated from the process gases. The latter are either recycled in the system and used as diluent in the reforming operation after suitable preheating or are discharged from the system as a purge stream.

After the reactor has been on stream for some time, the catalyst particles become deactivated by the accumulation of carbonaceous deposits thereon. It then becomes necessary to discontinue the introduction of reactants and to regenerate the catalyst particles. This is effected by preheating a regeneration gas such as steam or carbon dioxide with or without air to a temperature of between 1000 and 2000° F., preferably about 1300 to 1600° F. and passing the regeneration gas through the catalyst bed in a direction opposite to that in which the hydrocarbon materials are passed when the reactor is on stream. Regeneration is ordinarily carried out for periods of about 1 hour to about 24 hours or until inactivating deposits are removed. When regeneration is complete, the supply of regeneration gas is discontinued and the unit placed on stream again by supplying hydrocarbon reactant and diluent thereto.

The following example is illustrative of the present invention.

*Example*

Two reactors A and B were charged with fresh activated carbon catalyst having a surface area of 1190 m.²/g. Reactor A was thereupon operated downflow for reforming by introducing a virgin naphtha cut from East Texas crude (boiling between 260° F. and 430° F.) and steam in the mol ratio of 5 mols of steam diluent for each mol of naphtha, into the top of the reactor. The reactor was maintained at 1010 to 1050° F. and a pressure of 75 lbs./sq. in. gauge with a naphtha feed rate of 1.5 w./w./hr. After 7 hours the supply of feed stock was stopped and steam at 1480° F. was passed downwardly through the catalyst bed at atmospheric pressure at a rate of 1.2 w./w./hr. for 7 hours. This cycle of operation was repeated five times whereupon the catalyst was removed from the reactor and the surface area of samples of catalyst from different levels in the bed was determined.

Reactor B was operated downflow for reforming by introducing the same feed stock and diluent into the top of the reactor at the same temperatures, pressures and feed rates as in the case of reactor A. After being on stream for the same length of time as reactor A, feed to reactor B was discontinued and steam at 1400° F. was passed upwardly through the catalyst bed at atmospheric pressure at a feed rate of 1.2 w./w./hr. for 7 hours. This cycle of operation was repeated four times whereupon the catalyst was removed from the reactor and the surface area of samples of catalyst from different levels of the bed was determined. The results are summarized in the table hereinbelow.

Table

|  | Reactor A Downflow Reforming Downflow Regeneration, Catalyst Out after 5 Cycles | Reactor B Downflow Reforming Upflow Steaming, Catalyst Out after 4 Cycles |
|---|---|---|
| S. A. in m.²/g. of Cat. Removed from:[1] | | |
| Top | 587 | 1,310 |
| Top Middle | 606 | 1,250 |
| Bottom Middle | 573 | ---- |
| Bottom | 458 | 1,108 |
| Fresh Catalyst | 1,190 | 1,190 |

[1] S. A. Surface Area: A measure of catalyst activity.

In reactor A using concurrent reforming and regeneration there was poor catalyst activity maintenance although more carbon was removed during regeneration than was deposited during reforming. Under similar conditions, however, in reactor B where regeneration was countercurrent to reforming, catalyst activity was maintained at a high overall level and even increased in the top portions of the bed.

The foregoing description contains a limited number of embodiments of the present invention. It will be understood, however, that numerous variations are possible without departing from the spirit of the following claims.

What is claimed is:

1. A process for naphtha improvement which comprises passing a virgin naphtha through a fixed bed of activated carbon catalyst particles at a temperature between about 900° and 1100° F., maintaining said naphtha in contact with the activated carbon catalyst for a sufficient period to obtain a substantial improvement in the antiknock characteristics of the naphtha, discontinuing the supply of naphtha to the catalyst bed after the same has undergone a loss in activity, regenerating the catalyst bed by passing steam at a temperature of 1000°–2000° F. through the bed of catalyst in a direction opposite to that in which the naphtha was passed and repeating this sequence of operations.

2. A process for naphtha improvement which comprises preheating a virgin naphtha to a temperature of 600°–800° F., preheating a vaporous diluent comprising gaseous materials formed during the process to a temperature of about 1000° to 1600° F., mixing vaporous diluent and naphtha and quickly passing the mixture through a fixed bed of activated carbon catalyst particles at a temperature between about 900°–1100° F., maintaining the naphtha in contact with the activated carbon catalyst for a sufficient period to obtain a substantial improvement in the antiknock characteristics of the naphtha, discontinuing the supply of naphtha to the catalyst bed after the same has undergone a loss in activity, regenerating the catalyst bed by passing steam at a temperature of 1000°–2000° F. through the bed of catalyst in a direction opposite to that in which the naphtha was passed and repeating this sequence of operations.

CLARK E. ADAMS.
CHARLES N. KIMBERLIN, JR.

REFERENCES CITED

The following references are of record in the file of this patent:

UNITED STATES PATENTS

| Number | Name | Date |
|---|---|---|
| 1,967,636 | Towne | July 24, 1934 |
| 2,150,930 | Lassiat | Mar. 21, 1939 |